(12) United States Patent
Kim

(10) Patent No.: US 9,813,266 B2
(45) Date of Patent: Nov. 7, 2017

(54) DISTRIBUTED COMBINED JUNCTIONAL TRANSFORMER

(71) Applicant: Benjamin Kim, McLean, VA (US)

(72) Inventor: Benjamin Kim, McLean, VA (US)

(*) Notice: Subject to any disclaimer, the term of this patent is extended or adjusted under 35 U.S.C. 154(b) by 242 days.

(21) Appl. No.: 14/806,470

(22) Filed: Jul. 22, 2015

(65) Prior Publication Data

US 2016/0028468 A1    Jan. 28, 2016

Related U.S. Application Data

(60) Provisional application No. 62/029,631, filed on Jul. 28, 2014.

(51) Int. Cl.
*H04B 7/14*       (2006.01)
*H04J 1/00*       (2006.01)
*H04L 25/26*      (2006.01)
*H04B 7/155*      (2006.01)

(52) U.S. Cl.
CPC .......... *H04L 25/26* (2013.01); *H04B 7/1555* (2013.01); *H04B 7/15528* (2013.01)

(58) Field of Classification Search
None
See application file for complete search history.

(56) References Cited

U.S. PATENT DOCUMENTS

| | | | | |
|---|---|---|---|---|
| 2002/0058490 A1* | 5/2002 | Sorrells | ............ | H03C 1/62 455/313 |
| 2004/0166817 A1* | 8/2004 | Mokhtari | ............ | H04L 27/06 455/91 |
| 2005/0094718 A1* | 5/2005 | Pasternak | ............ | H01Q 1/125 375/219 |
| 2005/0259760 A1* | 11/2005 | Casabona | ............ | G01S 19/21 375/260 |
| 2005/0286521 A1* | 12/2005 | Chiang | ............ | H04J 3/1652 370/389 |
| 2011/0043328 A1* | 2/2011 | Bassali | ............ | G07C 9/00182 340/5.71 |
| 2012/0106657 A1* | 5/2012 | Fischer | ............ | H04B 7/2606 375/259 |
| 2013/0107763 A1* | 5/2013 | Uyehara | ............ | H04B 7/024 370/278 |
| 2013/0279914 A1* | 10/2013 | Brooks | ............ | H04Q 11/0067 398/66 |
| 2015/0020134 A1* | 1/2015 | Bowler | ............ | H04N 21/2383 725/116 |

* cited by examiner

*Primary Examiner* — Kenny Lin

(57) ABSTRACT

The Distributed Combined Junctional Transformer (abbreviated in this document as repeater station) provides a system to take any input wireless signal in any frequency and using any modulation and multiplexing schemes, convert it to the desired format and frequency and subsequently transmits the new wireless signal. In accordance with an embodiment of the invention, a repeater station comprises: an input antenna section capable of receiving the input signal generated by any source device in radio, microwave, infrared, visible or ultraviolet spectrums; an input conversion section translating the input wireless signal to a baseband signal if required; a baseband processing section that interprets the information of the input signal, converts the signal to the desired format and controls the other sections; an output conversion section which translates the baseband frequency output signal to the desired carrier output frequency if required; and an output antenna section which transmits the output signal.

2 Claims, 3 Drawing Sheets

DISTRIBUTED COMBINED JUNCTIONAL TRANSFORMER

DETAILED DESCRIPTION

Figure 1:
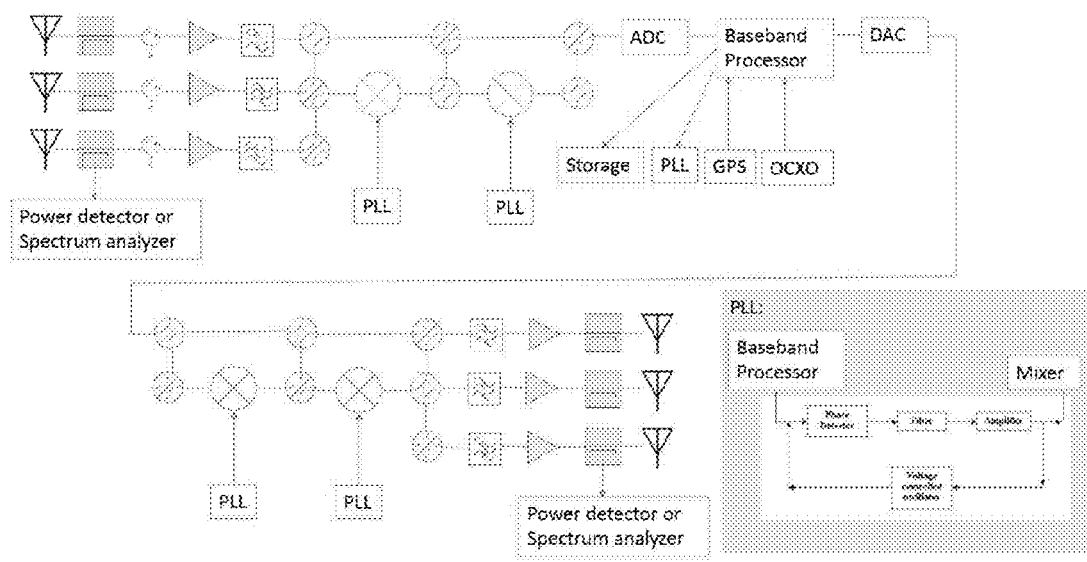

The Distributed Combined Junctional Transformer (abbreviated in this document as repeater station) provides a system to take any input wireless signal in any frequency and using any modulation and multiplexing schemes from a desired source, convert it to the user-defined format and frequency and subsequently transmits the new wireless signal to the desired location. The repeater station can subsequently be reconfigured either by manual user input or by packet header information embedded in the wireless signal. The wireless signals can take many forms from radio, microwave, infrared, visible or ultraviolet signals. The repeater station is meant to be scalable meaning multiple embodiments of the system are possible pending the requirements of the input and output wireless signals allowing for a cost competitive solution based on the needs of the implementation. In accordance with an embodiment of the invention, a repeater station comprises: for the radio and microwave input (see the next paragraph for infrared, visible or ultraviolet spectrum input), at least one or a group of selectable receive antennas which are specified for both frequency and polarization as a part of the input antenna system connected to a test coupler (optional) and then input circulator to prevent input saturation (optional) and then to a low-noise amplifier (LNA; optional) and filter (optional); a dual-stage mixers (optional) with the local oscillator signal being supplied from a reference such as a phase-locked loop (PLL) which is fed by the baseband processor to make frequency translation from the carrier frequency to baseband possible for any frequency and the first stage being capable of bypass which takes the signal to broadband frequencies as a part of the input conversion section; an analog-to-digital converter (ADC) with a programmable sampling rate controlled by the baseband processor; a baseband processor with an input clock reference such as an oven controlled crystal oscillator (OCXO) and a Global Navigation Satellite System (GNSS) input such as a US NAVSTAR GPS/Russian Glonass/EU Galileo/Chinese Beidou or Compass/Indian IRNSS/Japanese QZSS receiver or even a augmentation system based receiver such as the US WAAS/EU EGNOS/Japanese MSAS/Indian GAGAN receiver that will first complete the digital filtering for the desired input signal including multiplexing if required and then demodulate and interpret the framing with the possibility of data storage (optional) and then reframe to the desired formatting; a digital-to-analog converter (DAC) also with a programmable sampling rate controlled by the baseband processor to modulate, multiplex and return the information to the analog domain; another dual-stage mixers with PLL (optional); a filter (optional); an amplification stage utilizing wideband devices such as traveling wave tube amplifiers (TWTA; optional) or solid state power amplifier (SSPA; optional); an output test coupler (optional) as a part of the output conversion section connected to a transmit antenna for the correct frequency and polarization as a part of the output antenna system.

In the presence of an infrared, visible or ultraviolet spectrum input signal, a series of wavelength dependent device such as a photodiode mounted on a tracking gimbal (optional) as a part of the input antenna system connected directly to the analog to digital converters instead of the receive antennas, LNAs, filters, and mixers. Additionally, to filter and focus the input wireless signal, instruments that aid in the collection of electromagnetic radiation such as telescopes can be implemented in the input antenna system. Also for an infrared, visible or ultraviolet transmission, the DAC is connected to the optical output device such as a light-emitting diode (LED) or laser diode which may transmit through a series of focusing devices (optional) such as mirrors mounted on a tracking gimbal (optional) as a part of the output antenna system.

The input antenna system purpose is to be able to receive the input wireless signal which can take many forms depending on the characteristics of the input wireless signal. The input antenna system may consist of one or multiple antennas that may be steered either mechanically or electronically. For example, if the signal is very low in frequency such as less than 300 Hz, an extremely long whip antenna may be required or other known techniques such as on a mobile platform of formulating the whip antenna into a helical pattern can also be utilized. Helical antennas used in normal-mode have been used in broadcast television or FM radio for generations to physically reduce the size of the required antenna. Whereas, if the input wireless signal is very high such as 96 GHz, the input antenna will require a different configuration such as a large aperture high gain antenna due to atmospheric attenuation of these wireless signals. Wireless signals in more conventional frequency spectrums can be facilitated using another solution such as the smaller parabolic antennas common on the roofs of houses for satellite television or flat panel arrays similar to those in ships or aircraft. To maximize the efficiency of these various types of antennas, optionally a mechanical or electrical steering mechanism may be utilized to reduce pointing accuracies. Additionally, multiple antennas can be utilized as an alternative to larger antennas to improve the system's gain characteristic of the input wireless signal as well as the option for input test couplers to facilitate system performance measurements. As mentioned in the previous paragraph, the input antenna system would be configured in an alternative method for input wireless signals in the infrared, visible or ultraviolet spectrums.

When the input wireless signal is in the radio or microwave domains, the input conversion section will convert the wireless signal's characteristics as to be compatible with the ADC section of the baseband processor section. The input conversion section may consist of multiple switch matrices for routing, input circulators for protection of the hardware, LNAs for gain compensation, filter banks for signal processing, mixers for frequency conversion and local oscillators to facilitate the correct frequency conversions. The local oscillators would be given input from the baseband processor for the selection of the frequency conversion as well as the reference clock signal. For example, if the input wireless signal is already at a compatible frequency to the ADC section of the repeater station then this section can be used as a filtering stage as well as a routing stage within the repeater station as defined by the baseband processor. Whereas if the input wireless signal is for example at 30 GHz, then this stage can first route the signal as appropriate, amplify the incoming signal based on the needs of the ADC section, route the signal through multiple filtering and down-conversion stages as required, and then route the signal to the ADC section in which all is controlled by the baseband processor. Conversely, if the input wireless signal is in the LF (low frequency) range of the spectrum such as AM radio then this stage can first route the signal as appropriate, amplify the incoming signal based on the needs of the ADC section, route the signal through multiple filtering and upconversion stages as required, and then route the signal to the ADC section in which all is controlled by the baseband processor. Whereas if the input wireless signal is in the infrared, visible or ultraviolet spectrums then the input conversion section would just be utilized for routing the signal.

The baseband processor is the controlling unit that defines the system's operation and enables the user-definition of how the wireless signal is interpreted, modified and the new wireless signal is transmitted. The baseband processor consists of a GNSS receiver, an analog-to-digital section, a digital-to-analog section, a control functionality to allow for the user definition of implementation of the system inclusive of system status and health, and a command functionality to implement the necessary configuration of all elements within the repeater station including selection and pointing of antennas, routing, filtering, frequency conversion, ADC characteristics, DAC characteristics, and power level for transmissions. The baseband processor's signal input comes from the input conversion section which has properly conditioned the input wireless signal to a level and frequency range capable of being interpreted by the ADC section within the baseband processor. The baseband processor then in the digital domain construes or understands the information being provided in the input wireless signal and performs several operations on this data including filtering and framing the information into the desired format in the re-programmable logic section. Optionally, the baseband processor can also store either the received or interpreted information for archival purposes in the digital domain. The translated information is then sent to the DAC section of the baseband processor to facilitate the desired multiplexing and modulation where the output is delivered to the output conversion section. With regard to telemetry, the baseband processor can supply status at a user-definable interval as well as provide indicators for system fault. The human machine interface to control the baseband processor and the entire repeater station is meant to be software driven allowing the user to be located either locally or remotely. Optionally, as the baseband processor can interpret the information from the input wireless signal, the control of the repeater station can also be implemented on a frame-by-frame basis by inclusion of the configuration modifications in the header information of each packet.

The purpose of the output conversion section is similar to the input conversion section as to convert the newly generated output wireless signal to the desired characteristics. The output conversion section may consist of multiple switch matrices for routing, amplifiers for gain compensation, filter banks for signal processing, mixers for frequency conversion and local oscillators to facilitate the correct frequency conversions as well as output test couplers for measurement purposes. The local oscillators would be given input from the baseband processor for the selection of the frequency conversion as well as the reference clock signal. The output conversion section will take the signal from the DAC section, route the signal appropriately, amplify it to the desired level, filter the signal and deliver it to the output antenna system for transmission. Whereas if the output wireless signal is in the infrared, visible or ultraviolet spectrums then the output conversion section would just be utilized for routing the signal.

The output antenna system is similar to the input antenna system. The purpose of the output antenna system is to be able to transmit the output wireless signal which can take many forms depending on the characteristics of the output wireless signal. The output antenna system may consist of one or multiple antennas that can be steer either mechanically or electronically. As mentioned in the text above, the output antenna system would be configured in an alternative method for output wireless signals in the infrared, visible or ultraviolet spectrums.

TECHNICAL FIELD

The repeater station relates to any source device that is capable of generating or receiving a signal in either radio, microwave, infrared, visible or ultraviolet spectrums, reads the information, formats the translation as defined by a user and transmits the new signal in the desired format and frequency to the desired recipient device. An example of the connectivity would be between a line-of-sight (LOS) VHF handheld radio using frequency modulation without framing in a vertical polarization converted to a Ka-band satellite uplink using Generic Stream Encapsulation for the framing with low-density parity-check code error checking with an 8PSK modulation in a left-hand circular polarization,

BACKGROUND OF THE INVENTION

Wireless service providers are under constant pressure by their customers to improve and expand coverage while decreasing the cost of service. This conflicts with the pressure from investors and stockholders to increase earnings and decrease expenses. In addition, local zoning and regulatory pressures often limit or preclude placement of base station sites in the optimum locations. Additionally, as technology progresses, wireless service providers and their suppliers are constantly having to spend large amounts of capital to upgrade existing base stations to be able to support new modulation schemes and released frequency spectrums.

This invention incorporates several concepts to create a "future-proof" repeater that significantly reduces the costs for a repeater site. It will allow for wireless service providers to launch next generation networks utilizing only software changes. In one embodiment of the invention, the only equipment to install is the repeater itself and the primary power cables. In addition, the repeater station in this invention contains support software and equipment to allow the repeater station to perform antenna alignment and gain set up with only minimal support from technical personnel. Changes to the modulation scheme, frequency bands, power levels, regulatory requirements, or any other parameter can be satisfied solely by software changes remotely. This invention, while potentially increasing the one-time hardware repeater costs, dramatically results in a reduction of the total cost of a repeater site as then tower service providers can automatically support all the wireless service providers and incremental as well as generational changes without hardware changes or site-visits.

This invention can also be used to provide in a vast array of applications on any platform whether it be stationary or mobile (to encompass marine, auto, airborne, and space-based platforms) to provide interconnectivity where previously not possible. Additionally, being that any transmitted source of data is a potential input, this invention can provide functionality that is not currently available to the mass market to include technologies that both currently exist such as providing traditional 2.4 GHz WiFi from cellular base stations to technologies that do not have existing market utilization or products such as 96 GHz EHF microwave links on satellites.

BRIEF SUMMARY OF THE INVENTION

Accordingly, the present invention provides a translation of any input signal in any format to any output signal in any format as defined by a user. The invention definition including the features is described in the appended claims.

BRIEF DESCRIPTION OF THE FIGURES (DRAWINGS)

Figure 2:
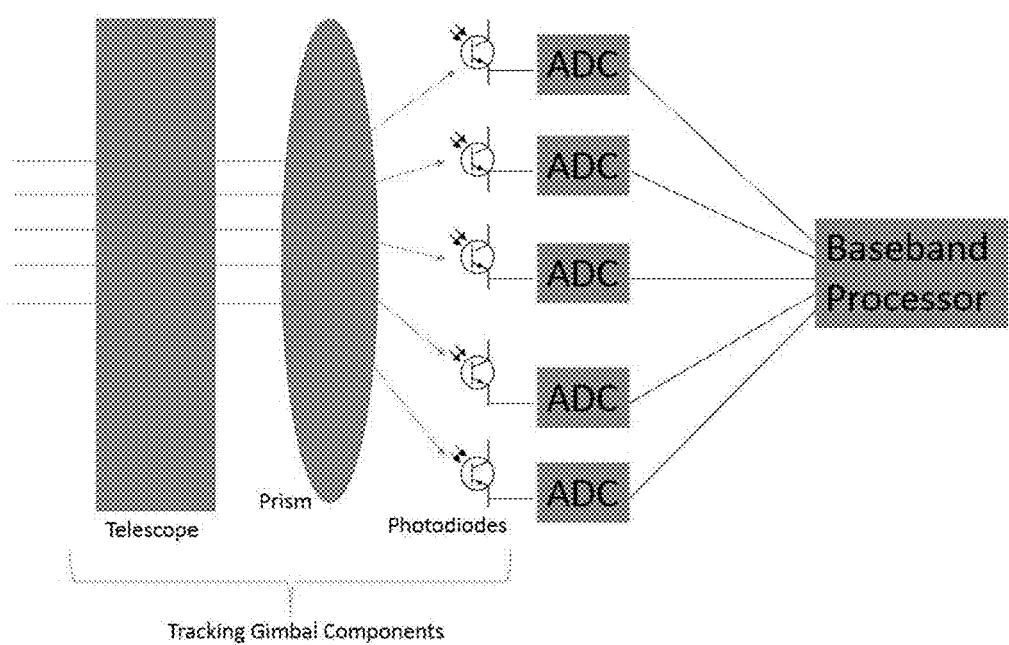
Figure 3:
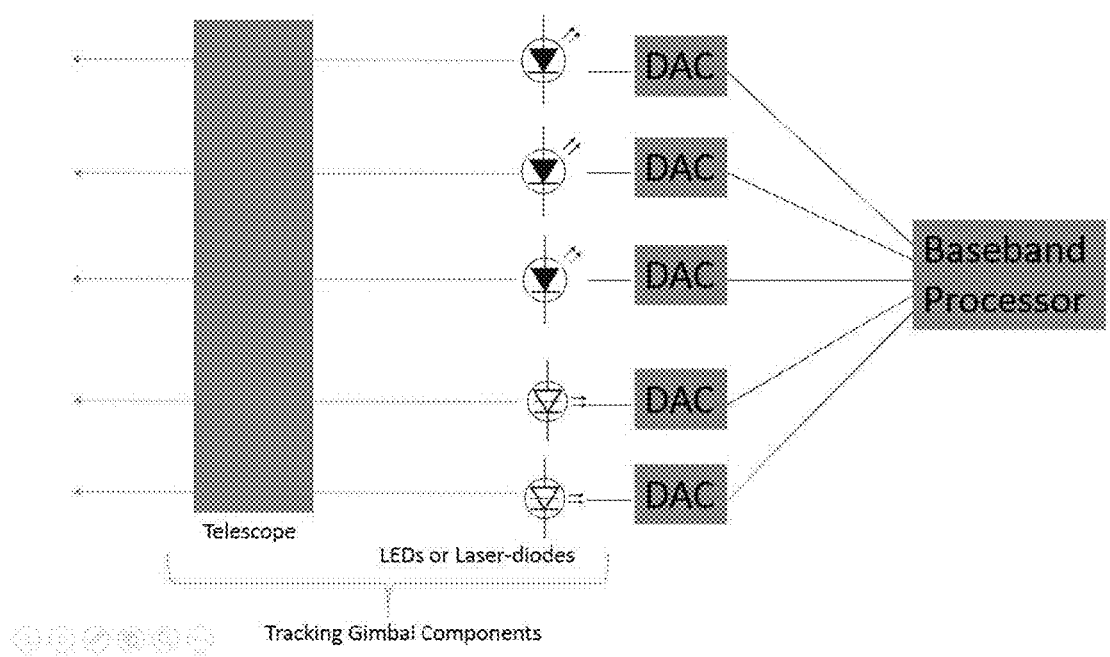

FIG. 1 is a block diagram of the system from receive (RX) antennas to transmit (TX) antennas FIG. 2 is a substitute block diagram of the system for the RX portion in the infrared, visible and ultraviolet spectrums FIG. 3 is a substitute block diagram of the system for the TX portion in the infrared, visible and ultraviolet spectrums.

I claim:

1. A repeater station provides a system to take any input wireless signal using any modulation and multiplexing schemes, convert the input wireless signal to a user defined desire format and frequency and subsequently transmits the new output wireless signal comprising:
    an input antenna section capable of receiving the input wireless signal;
    an input conversion section conditioning the input wireless signal to a baseband frequency capable of conversion into digital domain;
    a baseband processing section that can perform the functions of converting the conditioned input wireless signal into the digital domain, digital signal processing, conversion to analog domain while modulation and multiplexing as desired, configuration management, reference signal generation, as well as telemetry and commanding functions;
    wherein the baseband processing section further comprising:
        a command and telemetry processing section that can communicate external to the repeater station to provide status and receive commands allowing the user to define the operation of the repeater station as well as communicate within the repeater station to various sections including an analog-to-digital converter section, a digital-to-analog converter section, and a re-programmable logic section;
        said analog-to-digital converter section encompassing a first programmable sampling rate controlled by the command and telemetry processing section;
        said re-programmable logic section configured to facilitate the filtering, sampling required to decoded any modulation scheme including frequency, amplitude and phase, and interpret the framing and then reframe; and
        said digital-to-analog converter section encompassing a second programmable sampling rate controlled by the command and telemetry processing section and multiplex and modulate to a desired formatting;
    an output conversion section conditioning the baseband frequency signal to a desired carrier output frequency; and
    an output antenna section transmitting the new output wireless signal.

2. The repeater station from claim 1 in which the wireless signal is a wireless signal selected from a radio, microwave, infrared, visible or ultraviolet spectrums signal.

\* \* \* \* \*